No. 718,791. PATENTED JAN. 20, 1903.
J. B. POLLARD.
ROTARY ENGINE.
APPLICATION FILED APR. 14, 1902.
NO MODEL.
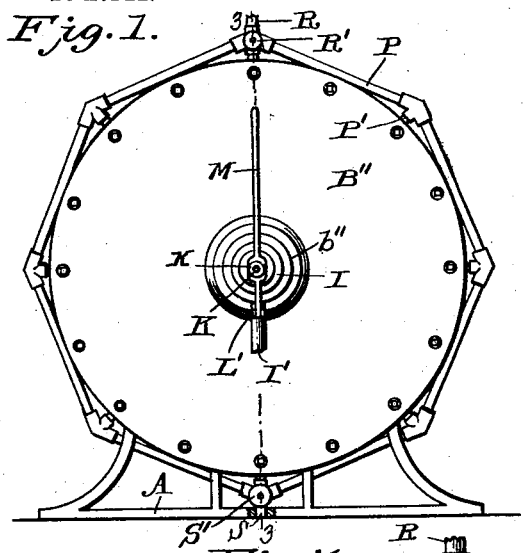
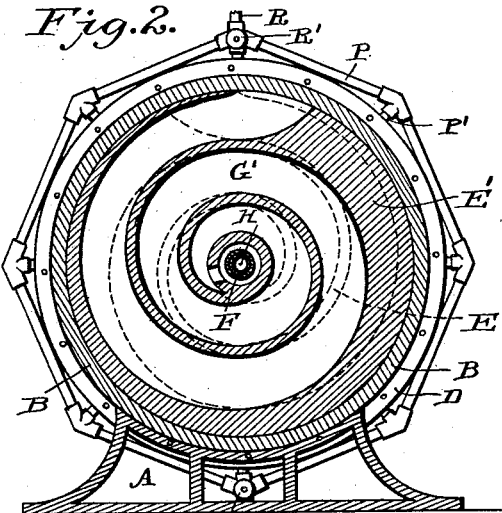
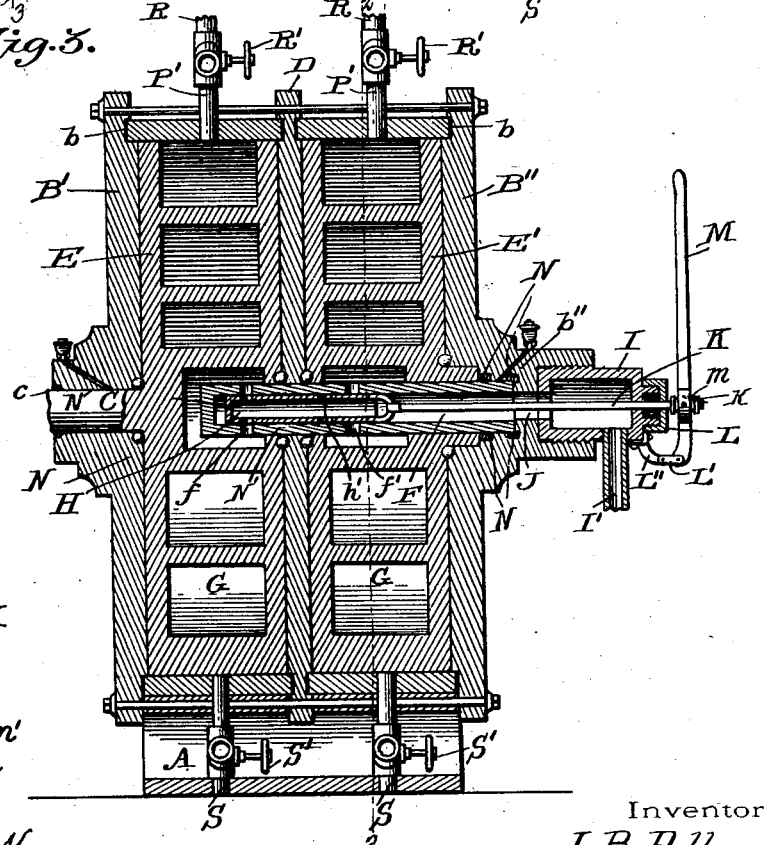
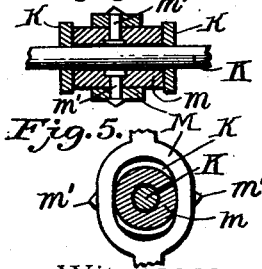
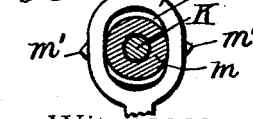
Witnesses.
Edwin G. McKee.
Philip C. Mase.
Inventor.
J. B. Pollard,
by E. W. Anderson,
his Attorney.

UNITED STATES PATENT OFFICE.

JAMES BAKER POLLARD, OF ROANOKE, VIRGINIA.

ROTARY ENGINE.

SPECIFICATION forming part of Letters Patent No. 718,791, dated January 20, 1903.

Application filed April 14, 1902. Serial No. 102,880. (No model.)

*To all whom it may concern:*

Be it known that I, JAMES BAKER POLLARD, a citizen of the United States, and a resident of Roanoke, in the county of Roanoke and State of Virginia, have made a certain new and useful Invention in Rotary Engines; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side elevation of my engine. Fig. 2 is a section on the line 2 2, Fig. 3. Fig. 3 is a section on the line 3 3, Fig. 1. Figs. 4 and 5 are detail views illustrating the connection of lever M with rod K.

This invention has relation to rotary engines, and is designed to provide an engine of this class which is simple and practical in its construction and operation and which is economical in point of steam consumption.

With these objects in view the invention consists in the novel construction and combination of parts, all as hereinafter described, and pointed out in the appended claims.

Referring to the accompanying drawings, the letter A designates the open bed of the engine, to which is secured an engine-casing B. This casing consists of a cylindrical body portion and two end heads B' B'', into which the ends of the body portion are shouldered, as shown at $b$.

C designates the engine-shaft, which has a bearing at $c$ in a boss or axial extension of the casing-head B'.

The casing B is divided into two compartments or chambers by a vertical partition D, and in each of said compartments is a power-wheel or rotary piston E or E', which fits neatly therein, but so as to turn without friction. The wheel E is rigidly connected to the inner end of the shaft C, while the wheel E' is secured on a hollow sleeve-shaft F, to which the wheel E is also secured. Each of the said wheels has therein a scroll-shaped or volute spiral steam-passage G, which extends from the center of the wheel out through the periphery thereof, as shown. These steam-passages are the same in the two wheels, except that they extend in opposite directions to each other, as indicated in Fig. 2.

The hollow sleeve-shaft F, above referred to, has a bearing at its outer or right-hand end portion in an extension $b''$ of the casing-head B'', and it extends axially through the wheel E', the central partition D, and into the inner end portion of the passage G of the wheel E. It is closed at its inner end, is open at its outer end, and has two ports $f$, which communicate with the passage of the wheel E, and two ports $f'$, which communicate with the passage of the wheel E'. Fitted to reciprocate within the said shaft is a cylinder-valve H, which has ports $h$, which are designed to be brought to register with the ports $h$, and other ports $h'$, which are designed to be brought to register with the ports $f'$. This valve has a closed inner end, but is open at its outer end.

The extension $b''$ of the head B'', above referred to, has formed therein an internally-threaded seat or chamber for a steam cylinder or chest I, to which steam is admitted by a supply-pipe I' and which communicates with the open end of the sleeve-shaft F by means of a passage J.

Connected to the open end of the valve H is a rod K, which extends through the shaft F, the passage J, and the steam-chest I, the latter having in its outer head a stuffing-box L for the said rod. M is a lever for operating the said rod and thereby the valve to control the admission of steam to either one or neither of the two power-wheels. This lever is pivoted at its lower end to one end of a link L', which in turn is pivoted to a fixed support L''. The lever M engages the rod K between two collars $k$ thereof and has a loose sleeve $m$ set on the pivot-studs $m'$.

N designates packing-rings which are provided at the points of bearing of the shafts C and F, as shown. The valve H has a packing-ring N'.

It will be understood from the foregoing and from the drawings that both wheels E E' revolve together and that the shaft F and valve H also revolve therewith, the direction of rotation being determined according to which of the wheels steam is admitted.

P P designate two exhaust-pipes which entirely surround the casing B, one around each compartment thereof, and which communicate with their respective compartments by means of a series of short pipes P'. The pipes P are each provided at the top of the engine or at some other convenient point with an escape or return pipe R and a shut-off or regulating valve R', and at the bottom each of said pipes P has a drain-pipe S for carrying off the water of condensation and a cut-off or drain valve S'.

Steam being admitted to the wheel E or E' at the center thereof passes out through the passage G and against the inner wall of the casing-compartment, thereby by its reactionary force causing the rotation of said wheel in a direction reverse to the direction of the said passage. By means of the valves R' and S' the steam can be held in the wheels until it condenses or until its energy is lost, thereby utilizing to a maximum degree the energy of the steam and making the engine an economical one in point of steam consumption.

I desire to state that while in describing the engine I have referred to steam as the motive power compressed air may be used as the motive power, the engine being adapted to the use of either steam or air.

Having thus described my invention, what I claim as new, and desire to secure by Letters Patent, is—

1. In a rotary engine, the combination with an inclosed chamber, of a rotary piston, or power-wheel journaled therein to turn in close relation to the wall of said chamber but without friction thereon, said wheel having therein a continuous spiral or scroll-shaped steam-passage extending from its central portion out through its circumference, means for supplying steam to the said passage at its inner end portion, and a valved exhaust-pipe, substantially as specified.

2. In a rotary engine, the combination with a closed chamber, of a rotary piston or power-wheel journaled therein, and containing a spiral or scroll-shaped steam-passage which extends from its central portion out through its periphery, means for supplying steam to the inner end portion of the said passage, an exhaust-pipe surrounding the said chamber exteriorly thereof, and communicating therewith by connecting-pipes at different points around its circumference and valved escape and drain pipes connected to the said exhaust-pipe, substantially as specified.

3. In a rotary engine, the combination with a casing divided into two compartments, of a power-wheel, or rotary piston in each of the said compartments and connected with each other to rotate together, each of the said wheels having therein a spiral or scroll-shaped steam-passage which extends continuously from its central portion to and through its circumference, the said passages in the two wheels extending in opposite directions, the steam-chest at one end of the said casing, the hollow shaft which extends centrally through one of the said wheels, and into the central portion of the other, and which has ports which communicate with the inner ends of the steam-passages of both wheels, said shaft having communication with the steam-chest, a reciprocating valve in the said shaft for controlling its said ports, means for operating the said valve, and exhaust-pipes which communicate with the said compartments, substantially as specified.

4. In a rotary steam-engine, the combination with the casing divided into two compartments, of the power-wheels, or rotary pistons, one in each of said compartments, and having each therein a continuous spiral or scroll-shaped steam-passage which extends from its central portion to and through its circumference, said passages extending in opposite directions in the two wheels, the central hollow shaft which connects the two wheels, and which has ports opening into the steam-passage thereof, a steam-chest with which the said shaft communicates at one end, a reciprocating hollow cylinder-valve in said shaft for controlling the ports thereof, means for operating the said valve, and an exhaust-pipe surrounding each of the said chambers or compartments, exteriorly thereof, and communicating therewith at different points around their circumferences, substantially as specified.

In testimony whereof I affix my signature in presence of two witnesses.

JAMES BAKER POLLARD.

Witnesses:
H. M. DARNALL,
A. S. ASBURG.